(12) United States Patent
Lambiase

(10) Patent No.: US 6,862,581 B1
(45) Date of Patent: Mar. 1, 2005

(54) PATCH DISTRIBUTION SYSTEM, METHOD AND COMPUTER PROGRAM PRODUCT

(75) Inventor: Serena Lambiase, Richardson, TX (US)

(73) Assignee: Networks Associates Technology, Inc., Santa Clara, CA (US)

( * ) Notice: Subject to any disclaimer, the term of this patent is extended or adjusted under 35 U.S.C. 154(b) by 138 days.

(21) Appl. No.: 10/327,539

(22) Filed: Dec. 20, 2002

Related U.S. Application Data

(63) Continuation of application No. 10/324,840, filed on Dec. 19, 2002.

(51) Int. Cl.[7] .................................................. G06F 9/44
(52) U.S. Cl. ...................... 705/51; 717/106; 717/122; 717/169; 717/174; 717/175; 707/10; 707/101; 707/202; 707/203; 701/1; 701/2; 341/51; 705/1
(58) Field of Search .............................. 705/1, 39, 51, 705/57, 59; 717/106, 122, 169, 174, 175; 707/10, 101, 202, 203; 710/2; 341/51; 701/1, 2

(56) References Cited

U.S. PATENT DOCUMENTS 5,790,856 A * 8/1998 Lillich .......................... 717/163
6,496,974 B1 * 12/2002 Sliger et al. ................. 717/106

* cited by examiner

Primary Examiner—James P. Trammell
Assistant Examiner—Daniel L. Greene
(74) Attorney, Agent, or Firm—Zilka-Kotab, PC; Christopher J. Hamaty

(57) ABSTRACT

A system, method, and computer program product are provided for distributing software patches utilizing a network. Initially, information relating to at least one application program is collected from a plurality of computer utilizing a network. It is then determined whether the application program has been altered on the computers based on the information. Patches are then distributed to the computers, if it is determined that the application program has been altered on the computers.

24 Claims, 6 Drawing Sheets

PATCH DISTRIBUTION SYSTEM, METHOD AND COMPUTER PROGRAM PRODUCT

RELATED APPLICATION(S)

This application is a continuation of an application filed Dec. 19, 2002 under Ser. No. 10/324,840 and entitled "SOFTWARE LICENSE REPORTING AND CONTROL SYSTEM AND METHOD" and naming the same inventor, which is incorporated herein by reference in its entirety.

FIELD OF THE INVENTION

The present invention relates to software, and more particularly to software patches.

BACKGROUND OF THE INVENTION

It is well known that software is not purchased, but only licensed for use. Software, unlike manufactured products, can be freely copied and distributed. Hence, software providers are largely limited in their choice of control means. Unfortunately, a software license is merely a legal mechanism, and can not literally prevent illicit copying of proprietary software.

A typical software license grants a permit to use the licensed software application on a particular machine and, perhaps, the generation of backup copies for personal use. A software license provides a software provider with a legal instrument against impermissible use of licensed software. However there remains no effective mechanism for preventing or monitoring illicit copying or illegal proliferation in the first place. Hence, software providers must rely on the public to not pirate software, and rely on their licensees to abstain from furnishing copies of software to friends or others.

Software sold for use in a commercial or institutional setting is frequently licensed for a predefined period of time. When such software is used on desktop computers, such computers are typically networked. The networked computers are usually connected to a file server, which the file server may itself be tended by a computer management system that monitors and controls various file server groups. The file server computers act as a central location at which the desktop computers in the file server group can access files and applications. The file server also may facilitate the control of licensed software on the desktop computers. This occurs in the situation where the commercial software license is a so-called "floating license."

Commercial software licenses for operating a plurality of desktop computers normally are of two varieties: "fixed" or "floating." A fixed license permits a software application to run on certain designated computers (e.g., computer numbers one through five, in a ten computer file server group, are designated for the licensed software application). A floating license permits a certain number of applications to run on any number of computers at a given time. So an application operating under a floating license may be allowed to simultaneously run on no more than ten of twenty computers in a network at any given time. Licensing management software is maintained in the network file server to monitor the number of floating licenses being used.

A significant amount of software piracy occurs in commercial settings. Commercial licensees are usually vigilant about license compliance. However, even the most attentive MIS (Management Information Systems) manager cannot prevent employees from copying software off of one computer for use on other computers on the network. As a result of illicit copying, software providers must adjust their prices, forcing legitimate buyers to pay higher prices to offset revenue losses.

MIS managers often want to know whether various software is installed/used on various machines not only for license compliance, but also for cost-cutting purposes. For example, if applications with a "floating" license are installed on a first set of computers but are unused, such "floating" license-applications may be moved to another set of computers requiring such applications or terminated. In any case, the number of required licenses is reduced, thus reducing costs.

Unfortunately, ascertaining the information required to perform the foregoing analysis is cumbersome if not impossible.

DISCLOSURE OF THE INVENTION

A system, method, and computer program product are provided for distributing software patches utilizing a network. Initially, information relating to at least one application program is collected from a plurality of computer utilizing a network. It is then determined whether the application program has been altered on the computers based on the information. Patches are then distributed to the computers, if it is determined that the application program has been altered on the computers.

In one embodiment, the application program may be distributed to the computers utilizing the network. Still yet, it may be determined whether the distributed application program is faulty based on the information. It may further be determined whether a previous version of the application program exists. If the previous version of the application program exists, the previous version of the application program may be reloaded.

As an option, the application program may be distributed utilizing a desktop manager and/or a network browser. Still yet, the application program may be distributed in a scheduled manner. Such scheduling may be based on a timing in which the network is capable of handling the distribution of the application program.

As yet another option, a license associated with the application program may be managed in addition to the patch distribution.

DESCRIPTION OF THE PREFERRED EMBODIMENTS

Figure 1:
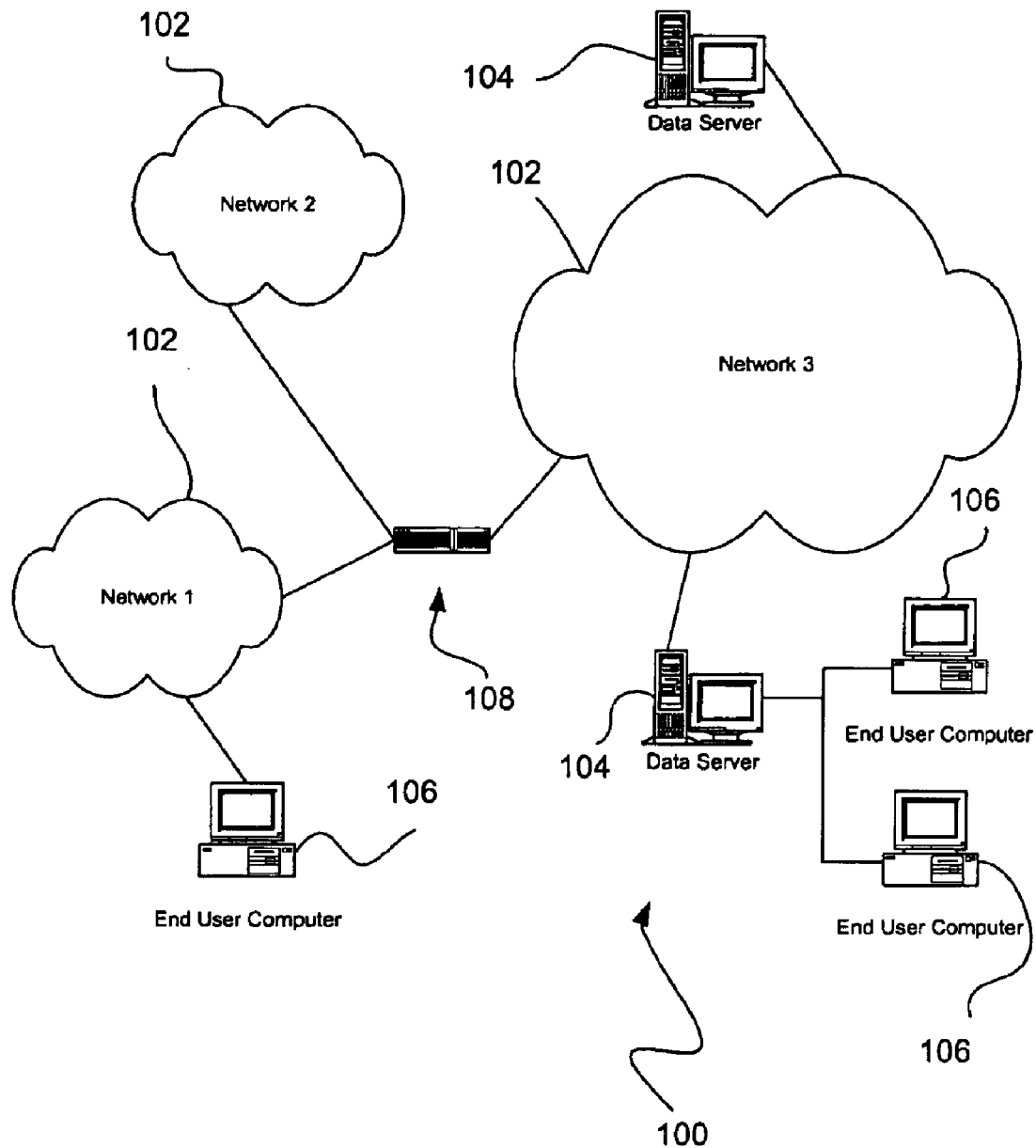
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween. It should be noted that each of the foregoing network devices as well as any other unillustrated devices may be interconnected by way of a plurality of network segments.

Figure 2:
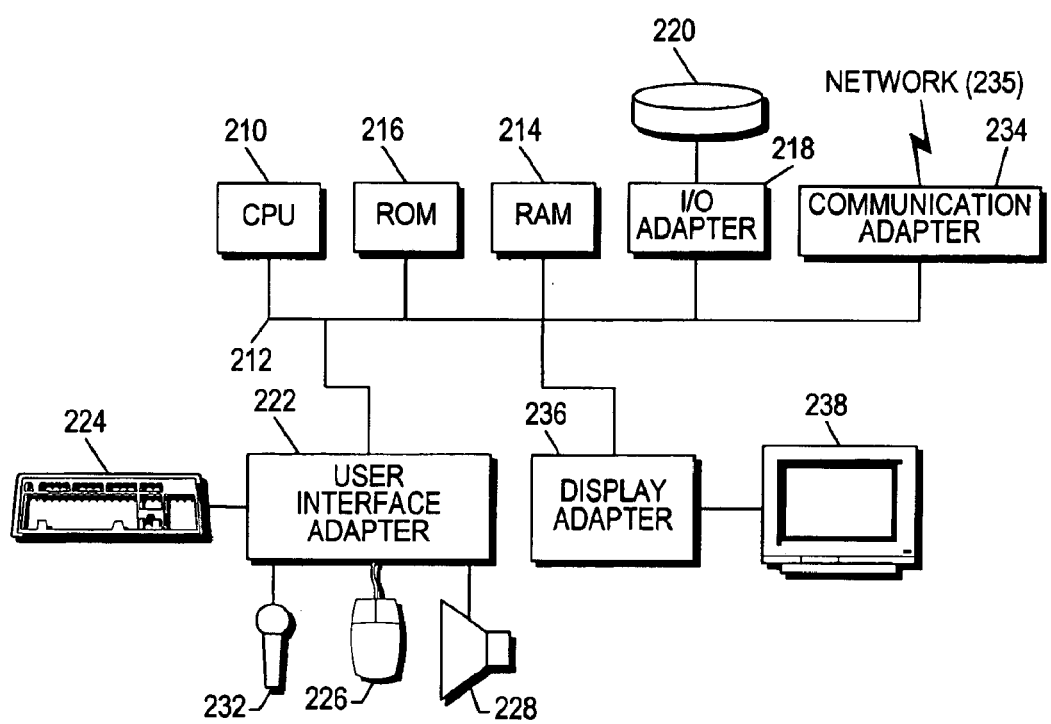
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
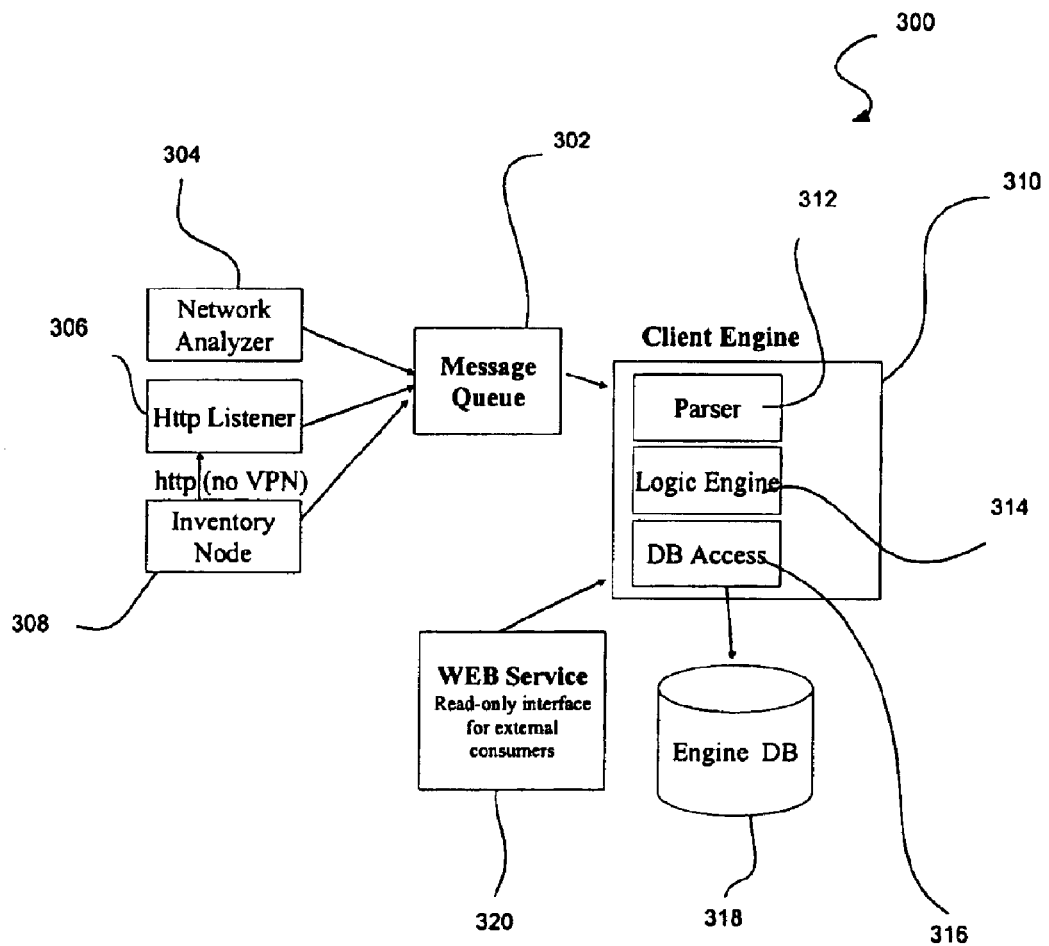
FIG. 3 illustrates a system adapted for desktop management, in accordance with one embodiment.

FIG. 3 illustrates a system 300 adapted for desktop management, in accordance with one embodiment. As an option, the present system 300 may be implemented in the context of the architecture of FIGS. 1 and 2. Of course, the system 300 may be implemented in any desired context.

As shown, the present system 300 includes a desktop management platform capable of various functionality including software distribution, inventory collection, asset management, etc. In particular, a message queue 302 is provided. In the present embodiment, such message queue 302 may include any technology that enables applications running at different times to communicate across heterogeneous networks and systems that may be temporarily offline. Applications send messages to queues and read messages from queues. In one embodiment, such message queue 302 may include MSMQ® available from Microsoft®.

Feeding the message queue 302 is a plurality of applications including a network analyzer 304. Such network analyzer 304 may be relied upon to analyze networks communications at a plurality of layers. One example of such analyzer 304 is the Sniffer® device manufactured by Network Associates®, Inc. In use, the analyzer 304 may collect information for the purpose of determining why network performance is slow, understanding the specifics about excessive traffic, and/or gaining visibility into various parts of the network.

Also coupled to the message queue 302 is an HTTP listener 306 capable of listening or reading HTTP traffic. Feeding both the HTTP listener 306 and the message queue 302 is an inventory node 308 for storing and providing inventory information.

Coupled to the message queue 302 is a desktop manager client 310 for receiving information from the message queue 302 to carry out the functionality mentioned hereinabove (i.e. software distribution, inventory collection, asset management, etc.). Included with the desktop manager client 310 is a parser 312 for parsing inputted data, and a logic engine 314 for carrying out various specific functionality.

Figure 4:
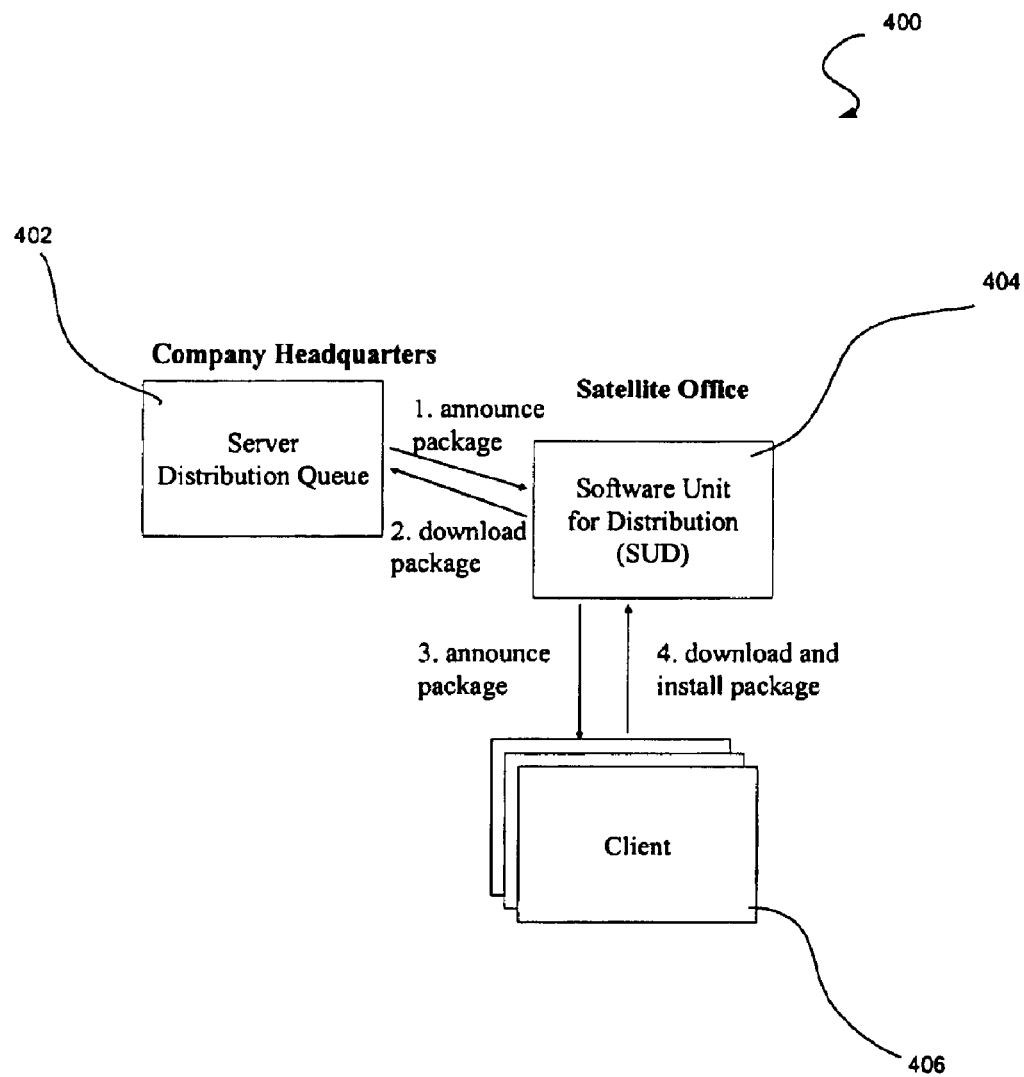
FIG. 4 illustrates an exemplary system adapted for carrying out inventory collection, in accordance with one embodiment.
Figure 5:
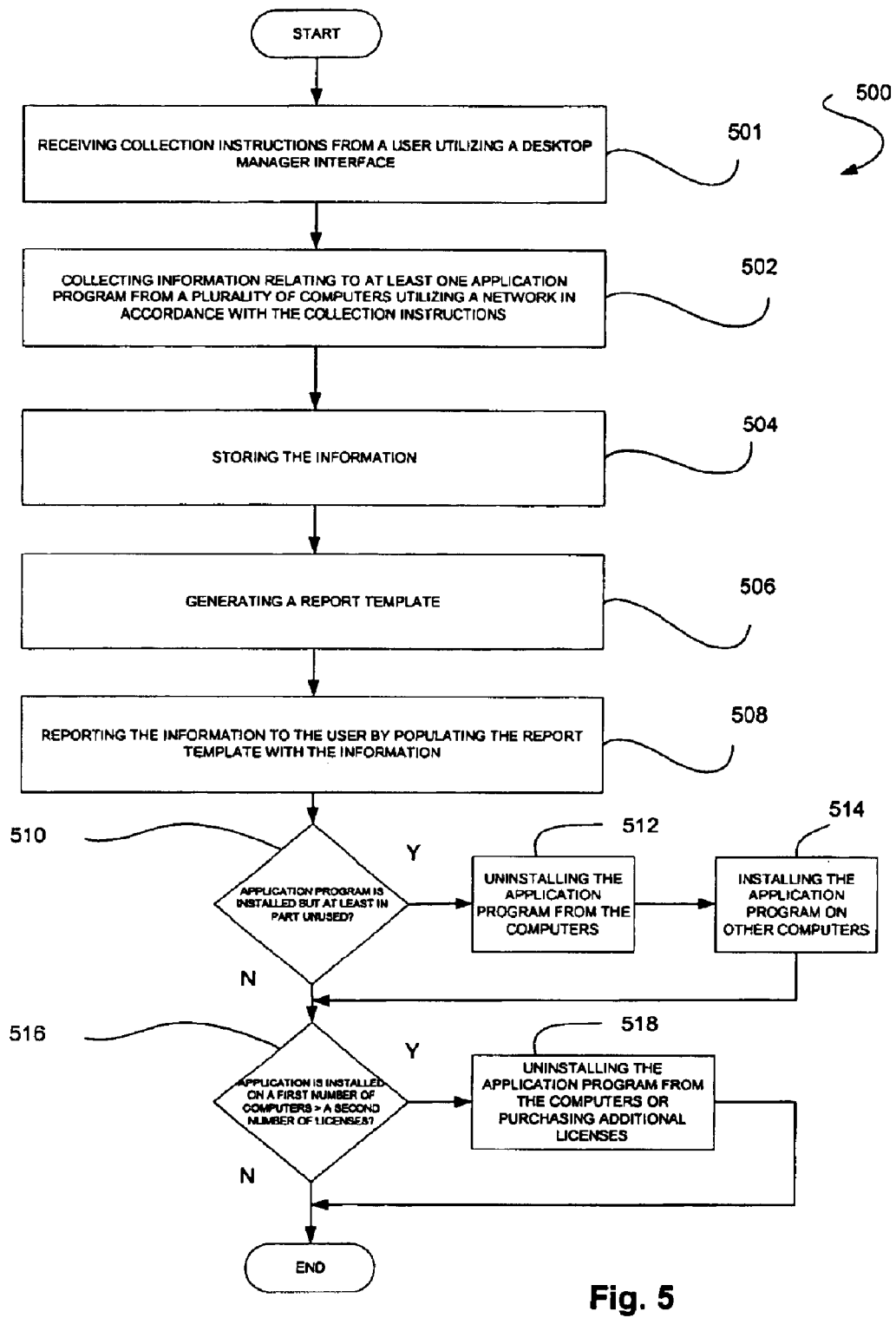
FIG. 5 illustrates a method for managing licenses associated with an application program utilizing a network, in accordance with one embodiment.
Figure 6:
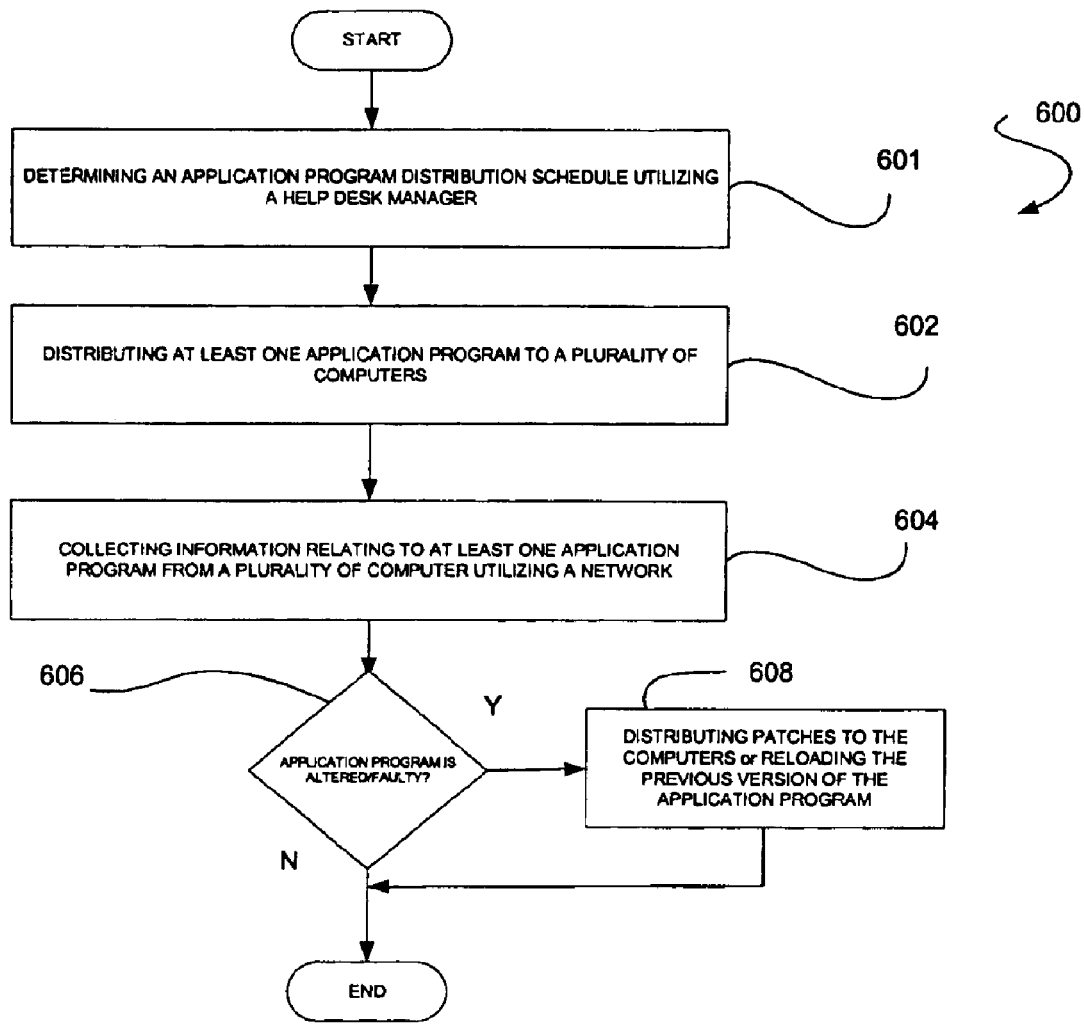
FIG. 6 illustrates a method for distributing patches associated with an application program utilizing a network, in accordance with one embodiment.

More information regarding such specific functionality will be set forth in greater detail during reference to FIGS. 4–6. To facilitate the functionality of the logic engine 314, coupled thereto is an engine database 318 for storing related information, which may be accessed by an access module 316. Various Web Services 320 may also interact with the desktop manager client 310 for providing a read-only interface for external users. As an option, the desktop manager client 310 may be integrated with an e-policy orchestrator (i.e. ePO® available from Network Associates®).

In use, the system 300 is adapted for distributing application programs to multiple computers connected thereto. Access may be provided to a web site with a personalized software catalog for providing a user with access to appropriate application programs useful to the user. Security measures (i.e. encryption, signing, etc.) may also be incorporated into the distribution process.

The system 300 is further adapted for inventory collection regarding both hardware and software on a network. To accomplish this in a comprehensive manner, the present system 300 may work on all platforms (i.e. Windows® and non-Windows®, etc.). Still yet, to avoid network congestion, an inventory of changes (i.e. deltas, etc.) may be collected if a previous inventory has already been carried out. Still yet, the present system 300 may support a collection of mobile devices connected via the Internet, even if no VPN connection may be present.

With respect to asset management, the system 300 is capable of incorporating a bar-code scanner subsystem, allowing dynamic creation of inventory diagrams, allowing impact analysis of changes, establishing baseline configurations, comparing physical inventory to authorized inventory, etc.

FIG. 4 illustrates an exemplary system 400 adapted for carrying out inventory collection, in accordance with one embodiment. As an option, the present system 400 may be implemented in the context of the system of FIG. 3. Of course, the system 400 may be implemented in any desired context.

As shown, a server distribution queue 402 (i.e. at a company headquarters, for example) may announce a software package to a software unit 404 for distribution. Such announcement then gets propagated from the software unit 404 to a plurality of client computers 406. Next, the software package is downloaded from the server distribution queue 402 to the software unit 404 which, in turn, sends it to the client computers 406. Of course, it should be understood that this scenario is set forth for illustrative purposes only, and should not be construed as limiting in any manner.

FIG. 5 illustrates a method 500 for managing licenses associated with an application program utilizing a network, in accordance with one embodiment. As an option, the present method 500 may be implemented in the context of the system of FIG. 3. Of course, the method 500 may be implemented in any desired context.

As shown, in operation 501, collection instructions are first received from a user utilizing a desktop manager interface. In the context of the present description, the collection instructions may include any instructions that govern the collection of information. Moreover, the interface may include any graphical user interface that may or may not be associated with a system such as that of FIG. 3.

Just by way of example, the collection instructions may involve a timing, subject (i.e. which computers, etc.), duration, or any other aspect of the collection of information associated with an application program or lack thereof on a plurality of computers.

These various aspects and parameters may be even user-configurable, or programmable. Of course, the collection may be automatic or manual based on the desires of the user.

Thereafter, information relating to at least one application program is collected from a plurality of computers utilizing a network in accordance with the collection instructions. Note operation 502. Such information may include any information capable of being used to manage any aspect of a license(s) associated with the application program. As an option, this may be accomplished using Add/Remove Program Registry settings and/or a list of files specified by the administrator (e.g. *.exe, *.dll).

By way of example, the information may include a list of computers from which information was collected. As an option, this may involve a list of all computers with an indication as to whether the application program(s) is installed thereon. Identifiers may even be used to identify the application program(s). As an option, this may be accomplished by a scanning process. An exemplary scanning process is set forth in U.S. Pat. No. 6,230,199; which is incorporated herein by reference in its entirety for all purposes.

Still yet, the information may include any indication as to whether the application program was used on the computers and/or by whom. For example, a simple numerical indicator may be used (i.e. total number of computers with application program being used thereon, etc.), user-specific identifiers, and/or a simple Y/N flag indicating use or not. Even still, the information may include an indication as to a duration of use of the application program on the computers.

The duration information may be collected by requiring users to send a request when one wants to run an application program and an indication when they are finished. As will soon become apparent, this feature may allow a company to reallocate licenses that are not being used.

As an option, the aforementioned scan may also identify hardware and/or changes in hardware, in addition to application programs. By knowing more about the hardware, the location and type of application programs may be more easily ascertained. Table 1 below illustrates various hardware features that may be detected.

TABLE 1

Drive type
Drive number
Vendor Description
Cylinders
Heads
Sectors
Bytes per sector
Total Storage
Disk information:

Drive Letter
File System
Total Storage
Available Storage
Memory modules:

ECC Memory Module
Form Factor: (e.g. DIMM)
Memory Type: (e.g. SDRAM)
Parity:
Size
Socket Designator: (e.g. DIMM-2)
Speed Next, in operation 504, the information may optionally be stored in memory. A report template is then generated for facilitating the conveyance of the information to a user, as indicated in operation 506. In the context of the present description, the report template may include any type of data structure which may be used to convey the information in a manner that enables a user to make various decisions that will soon be set forth.

In operation 508, the information may be reported to the user by populating the report template with the information. At this point, various decisions may be made using the report. Of course, such decisions may be carried out in a manual and/or automated manner to accomplish license management (i.e. managing any aspect of a license(s) associated with the application program(s) or any aspect that is affected by such license(s), etc.)

For example, it may be determined in decision 510, based on the reporting, whether the application program is installed but at least in part unused on the computers. In other words, it is determined whether the application program is existent on the computers and whether at least one aspect thereof (i.e. an aspect provided for under the associated license) is being unused. Such a situation may indicate a "wasted" license, thus prompting the application program to be uninstalled from such computers. Note operation 512.

To this end, the license(s) associated with such application program may be made available to other users of other computers (or to other users on a computer). See operation 514. This may be accomplished, for example, by installing the application program on other computers or granting use to other users, or even terminating a license. There is thereby a cost savings provided by the present embodiment.

In another example, it may be determined whether the application program is installed on a first number of the computers that exceeds a second number of available licenses for the application program. See operation 516. Such situation would be indicative of license non-compliance. In such situation, a necessary number of instances of the application program may be uninstalled from the computers. Instead of and/or in addition to such, additional licenses may be purchased. Note operation 518. Of course, any type of decision may be made with respect to license management.

FIG. 6 illustrates a method 600 for distributing patches associated with an application program utilizing a network, in accordance with one embodiment. As an option, the present method 600 may be implemented in the context of the system of FIG. 3. Of course, the method 600 may be implemented in any desired context.

Initially, an application program distribution schedule is determined in operation 601. As an option, this may be accomplished utilizing a desktop manager, like that set forth in prior figures. In the context of the present description, the application program distribution schedule may refer to any time-based (i.e. times, durations, etc.) schedule in accordance with which an application program may be distributed.

Optionally, the application program distribution schedule may be based on a timing in which the network is capable of handling the distribution of the application program. For instance, the distribution may be carried out at a time when, based on historical information, the network has more bandwidth available. Thus, the distribution of the application program is less likely to affect network usage by others.

Next, in operation 602, at least one application program is distributed to a plurality of computers utilizing a network browser and a network. This distribution may be carried out based on the application program distribution schedule determined in operation 601.

After the distribution, information relating to the at least one application program may be collected from the computers utilizing the network. Instead of or in addition to the information collected during the method 500 of FIG. 5, the present collected information may include any information capable of indicating whether the application program has been altered and/or is faulty.

Just by way of example, the information may include a hash, a diagnostic, a manually entered indication regarding the application program, and/or any other desired information. Moreover, the information may be collected as a result of an analysis carried out at the computer on which the application program resides or on a server which performs the collecting.

Next, in decision 606, it is determined whether the application program has been altered and/or is faulty based on the information. If not, the method 600 of FIG. 6 ends, as shown. If, however, it is determined that the application program has been altered and/or is faulty, either or both of two things may happen.

In one example, patches are distributed to the computers in operation 608. In the context of the present description, a patch may include any computer code capable of fixing or altering an application program.

Instead of or in addition to the patches, a previous version of the application program may be installed, so that a user may continue use of the application program, albeit it being inferior use. Note again operation 608. As an option, the reloading may be conditioned on whether the previous version of the application program exists.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for distributing software patches utilizing a network, comprising:

determining an application program distribution schedule utilizing a desktop manager, wherein the application program distribution schedule is based on a timing in which a network is capable of handling the distribution of at least one application program;

distributing the application program to a plurality of computers utilizing a network browser and the network based on the application program distribution schedule;

after the distributing, collecting information relating to the application program from the computers utilizing the network;

determining whether the application program has been altered and based on the information; and if it is determined that the application program has been altered performing at least one operation selected from a group consisting of distributing patches to the computers, and reloading a previous version of the application program if the previous version of the application program exists.

2. The method as recited in claim 1, wherein the information is used to manage licenses associated with the application program.

3. The method as recited in claim 2, wherein the information includes a list of computers from which the information was collected.

4. The method as recited in claim 2, wherein the information includes an indication as to whether the application program is installed on the computers.

5. The method as recited in claim 2, wherein the information includes an indication as to whether the application program was used on the computers.

6. The method as recited in claim 2, wherein the information includes an indication as to who used the application program on the computers.

7. The method as recited in claim 2, wherein the information includes an indication as to a duration of use of the application program on the computers.

8. The method as recited in claim 2, wherein the information is collected relating to a plurality of application programs.

9. The method as recited in claim 8, wherein the computers are scanned to determine which application programs are installed on the computers.

10. The method as recited in claim 2, wherein the collecting occurs automatically.

11. The method as recited in claim 10, wherein the collecting occurs in accordance with a user-programmed schedule.

12. The method as recited in claim 2, wherein the collecting occurs on demand by the user.

13. The method as recited in claim 2, wherein the collecting is accomplished manually.

14. The method as recited in claim 2, and further comprising determining what information is to be collected from the computers.

15. The method as recited in claim 14, wherein the determining is user-configurable.

16. The method as recited in claim 2, wherein reporting is carried out by populating templates with the information.

17. The method as recited in claim 16, wherein the templates are user-configurable.

18. The method as recited in claim 2, wherein the information is used to identify whether the application program is installed but at least in part unused on the computers.

19. The method as recited in claim 18, wherein the application program is uninstalled on the computers if it is determined that the application program is installed but at least in part unused on the computers.

20. The method as recited in claim 19, wherein the application program is installed on other computers if it is determined that the application program is installed but at least in part unused on the computers.

21. The method as recited in claim 2, wherein the information is used to identify whether the application program is installed on a first number of the computers that exceeds a second number of licenses for the application program.

22. The method as recited in claim 16, wherein the collecting and the reporting are carried out utilizing a desktop manager.

23. A computer program product embodied on a computer readable medium for distributing software patches utilizing a network, comprising:

computer code for determining an application program distribution schedule utilizing a desktop manager, wherein the application program distribution schedule is based on a timing in which a network is capable of handling the distribution of at least one application program;

computer code for distributing the application program to a plurality of computers utilizing a network browser and the network based on the application program distribution schedule;

computer code for, after the distributing, collecting information relating to the application program from the computers utilizing the network;

computer code for determining whether the application program has been altered on the information; and computer code for, if it is determined that the application program has been altered, performing at least one operation selected from a group consisting of distributing patches to the computers, and reloading a previous version of the application program if the previous version of the application program exists.

24. A system for distributing software patches utilizing a network, comprising:

means for determining an application program distribution schedule utilizing a desktop manager, wherein the application program distribution schedule is based on a timing in which a network is capable of handling the distribution of at least one application program;

means for distributing the application program to a plurality of computers utilizing a network browser and the network based on the application program distribution schedule;

means for, after the distributing, collecting information relating to the application program from the computers utilizing the network;

logic for determining whether the application program has been altered based on the information; and means for, if it is determined that the application program has been altered, performing at least one operation selected from a group consisting of distributing patches to the computers, and reloading a previous version of the application program if the previous version of the application program exists.

* * * * *

UNITED STATES PATENT AND TRADEMARK OFFICE
CERTIFICATE OF CORRECTION

| | |
|---|---|
| PATENT NO. | : 6,862,581 B1 |
| APPLICATION NO. | : 10/327539 |
| DATED | : March 1, 2005 |
| INVENTOR(S) | : Lambiase |

It is certified that error appears in the above-identified patent and that said Letters Patent is hereby corrected as shown below:

Column 8, line 13, replace "altered and" with -- altered --;
Column 9, line 29, replace "altered on" with -- altered based on --.

Signed and Sealed this

Fifth Day of October, 2010

David J. Kappos
*Director of the United States Patent and Trademark Office*